United States Patent [19]

Tsukihashi et al.

[11] Patent Number: 5,054,015
[45] Date of Patent: Oct. 1, 1991

[54] TAPE RECORDER WITH DISC PLAYER

[75] Inventors: Akira Tsukihashi, Gunma; Tadashi Hitomi, Ota; Yoshiaki Tsubokura, Gunma; Takeshi Aoki, Ota, all of Japan

[73] Assignee: Sanyo Electric Co., Ltd., Osaka, Japan

[21] Appl. No.: 427,204

[22] Filed: Oct. 24, 1989

[30] Foreign Application Priority Data

Oct. 25, 1988 [JP] Japan ............................... 63-268988
Mar. 6, 1989 [JP] Japan ............................... 1-54503
Apr. 5, 1989 [JP] Japan ............................... 1-86550
Apr. 20, 1989 [JP] Japan ............................... 1-100772

[51] Int. Cl.⁵ ..................... G11B 33/02; G11B 5/02; G11B 5/10; G11B 5/008
[52] U.S. Cl. ..................... 369/258; 369/75.1; 369/292; 360/94; 360/96.6; 360/98.08; 360/99.05
[58] Field of Search ............ 369/258, 75.1, 292; 360/94, 96.6, 98.08, 98.06, 99.05

[56] References Cited

U.S. PATENT DOCUMENTS 4,331,988  5/1982  Kawai ..................... 360/96.6
4,345,283  8/1982  Maryschka .............. 360/96.6
4,815,066  3/1989  Horvath ................... 360/96.6
4,905,114  2/1990  Ohta et al. ............... 360/132

FOREIGN PATENT DOCUMENTS 58-218074  12/1983  Japan ..................... 369/75.1
59-107449   6/1984  Japan ..................... 369/75.1
 2183396    6/1987  United Kingdom ...... 360/96.6

Primary Examiner—Stuart S. Levy
Assistant Examiner—Kenneth B. Wells
Attorney, Agent, or Firm—Armstrong, Nikaido, Marmelstein, Kubovcik & Murray

[57] ABSTRACT

A tape recorder provided with a disc player, wherein a tape cassette accommodating portion is formed within a case, a tape winding reel shaft is provided in a position opposite to a hub on the tape winding side of a compact tape cassette to be engaged with the tape cassette accommodating portion, and a turntable for driving a disc is provided in a position opposite to the hub on the tape feed side, thereby to make it possible to reproduce the 8 cm CD disc although it is almost the same in size as the conventional headphone type of tape recorder.

9 Claims, 8 Drawing Sheets

TAPE RECORDER WITH DISC PLAYER

BACKGROUND OF THE INVENTION

1. Field of the Invention

The present invention generally relates to a tape recorder with a disc player attached to it, which is capable of regenerating a recording on either a tape cassette and a disc.

2. Description of the Prior Art

Generally, there is a tape cassette recorder or a disc player as a means for regenerating recorded music and so on. Conventionally the cassette tape recorder and the disc player are accommodated in separate cases or are accommodated in separate places within the same case. However, as a demand of making the case smaller is increased, it is considered that they should be accommodated in the same place of the same case as disclosed in, for example, Japanese Laid-Open Utility Model Application Jitsukaisho No. 62-77497.

As the rotary shaft of the disc player and the reel shaft of the cassette tape recorder are provided in positions away from each other, if the disc player and the cassette tape recorder are accommodated in the same place of the same case, the disc and the tape cassette are partially superposed so that the size cannot be made sufficiently small. Accordingly, it is still insufficient as a portable tape recorder for effecting regeneration of a recording by the use of a head horn. Recently a CD disc as small as 8 cm in diameter has been added to the standard size CD disc. The half diameter of such a 8 cm CD disc is smaller than the distance between the reel hubs of a Philips type of compact cassette (trade mark).

As the tape cassette and the disc ar superposed on each other, it is inconvenient that the disc or the cassette on the upper side is required to be removed, and thereafter the disc or the cassette on the lower side is engaged with or disengaged from the driving means.

Also, the disc player is required to clamp the disc against the turntable. Although the disc is requried to be disposed on the under side of the cassette in a construction where the turntable of the disc player is superposed on the reel shaft of the tape recorder, it is impossible to effect the clamping operation in such a construction as described hereinabove.

Also, if the tape recorder with a disc player attached to it is a type wherein the disc player and the cassette tape recorder are to be accommodated in the same place of the same case, the disc player and the driving mechanism of the tape recorder cannot be made sufficiently smaller in size, because they are completely independent. Therefore, it is still insufficient as a tape recorder for portable use, which uses the head horn to effect the regenerating operation. Recently, the 8 cm CD disc of smaller size is added as the new standard of the CD disc. The half diameter of such a 8 cm CE disc as described hereinabove is smaller than the space between the reel hubs of the Philips type of compact cassette (trade mark).

Also, the disc player and the tape recorder as a floor type may be accommodated in the same case. But as the disc player and the tape recorder are completely independent in the driving mechanism, the size thereof cannot be made sufficiently small. Accordingly, it is still unnecessarily large as a tape recorder for transportation use which effects the regenerating operation by the use of the head horn.

Also, if the tape recorder with a disc player attached to it is of a type in which the disc player and the cassette tape recorder are accommodated in the same place of the same case, the size thereof cannot be made sufficiently small, because the driving mechanism of the disc player and the tape recorder is completely independent. Accordngly, it is still insufficient as the tape recorder for the portable use which effects the regenerating operation by the use of the head horn. Recently the 8 cm CD disc smaller in size than the conventional one is added as the new standard of the CD disc. Although the diameter of such a 8 cm CD disc as described hereinabove is larger than the lateral length of the Philips type of compact cassette (trade mark), it is smaller than the longitudinal length.

SUMMARY OF THE INVENTION

Accordingly, in order to remove the disadvantages of the prior art, the present invention provides a tape recorder with a disc player attached to it, which has a tape winding reel shaft provided in one of the tape cassette accommodating portions, and a turntable for disc driving use is provided on the same shaft with the other tape feeding reel shaft. Also, the tape cassette holder is pivotally mounted on the tape cassette accommodating portion, with a clamper being provided in a position facing the turntable of the disc player. The tape recorder with the disc player attached to it having the above-described construction in accordance with the present invention is capable of regenerating or reproducing sound from the tape cassette and the disc. As the tape cassette is accommodated in the tape cassette holder, the disc may be replaced without disengagement of the tape cassette. Also, the tape cassette holder may be located in the tape musical performance position to clamp the disc.

Also, the tape recorder with the disc player attached to it in accordance with the present inention has a turntable for the musical performance of the disc, a flywheel having a capstan, and a reel shaft driving means within the case main body. An auxiliary chassis may also be provided to be pivoted on the tape cassette holder rotatably mounted on the case main body with the reel shaft provided on the auxiliary chassis, and a transmitting means which is detachable and engaged with the reel shaft is provided on the reel shaft driving means. The tape recorder of the present invention composed of the above-described construction is such that when the tape cassette holder has been provided in a musical performance position, the reel shaft driving means is engaged with the transmitting means to drive the reel shaft, and when the tape cassette holder has been located in the tape cassette detachable position, the auxiliary chassis is separated from the tape cassette holder to withdraw the reel shaft from the tape cassette admission passage so as to allow the tape cassette to be detachable.

Also, the tape recorder of the present invention is composed of a case main body, and a cassette holder, wherein the auxiliary chassis is pivotally provided and also, is mounted pivotally on the case main body, a spindle motor, and a turntable to be rotated by the spindle motor are provided on the case main body, a clamper which has a driving gear and is magnetically combined with the turntable, a transmission gear which is oscillably mounted and is engaged with the driving gear, and right and left tape reel shafts which have a reel gear to be selectively engaged with the transmission gear are provided on the auxiliary chassis. In the tape recorder of the above-described character, the turntable is magnetically connected with the clamper when the cassette holder is provided in the musical performance position. When the tape recorder is put into the regenerating condition under this condition, the rotation force of the spindle motor is transmitted into the reel gear through the turntable, the clamper, the driving gear and the transmission gear so as to rotate the reel shaft.

Also, the tape recorder of the present invention comprises a case main body which has a disc accommodating portion and a cassette accommodating portion formed facing upper and lower openings, a motor which is mounted in the center of the case main body with rotary shaft being projected from the disc accommodating portion and the cassette accommodating portion, a turntable mounted on the rotary shaft to be projected from the disc accommodating portion, a clamper provided in opposition to the turntable, a driving gear mounted on the rotary shaft to be projected from the cassette accommodating portion, a reel gear to be operatively cooperated with the driving gear through the transmission gear. In the tape recorder of the above-described construction, the disc is engaged with the turntable so as to allow the musical performance of the disc to be effected, or the cassette is engaged with the cassette accommodating portion to allow the musical performance of the tape to be effected, with the motor for driving the turntable and the reel shaft serving the double purpose so as to reduce the weight and size of the tape recorder.

Also, the tape recorder of the present invention is composed of a case main body, and a cassette holder mounted pivotally on the case main body with the auxiliary chassis being pivotally provided. A spindle motor, and a turntable to be rotated by the spindle motor are provided on the case main body, a capstan motor, a flywheel which has a capstan and is rotated by the capstan motor, a reel shaft and the clamper opposite to the turntable are provided on the auxiliary chassis. In the tape recorder of the present invention, when the cassette holder has been pivoted to the cassette taking-out position, the auxiliary chassis is pivoted to withdraw the reel shaft and the capstan from the cassette passage of the cassette holder, and when the cassette holder has been pivoted into the musical performance position, the reel shaft is engaged with the reel hub of the cassette within the cassette holder and also, the capstan is inserted, and the disc placed on the turntable is clamped by the clamper.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1 is a sectional view thereof in a use condition;

FIG. 2 is a sectional view showing the open condition of the tape cassette holder;

FIG. 3 is a sectional view of a tape winding reel shaft portion;

FIG. 4 is a plan view of the tape recorder of FIG. 1;

FIG. 5 is a cross sectional view showing the tape cassette engagement, disengagement condition;

FIG. 6 is a plan view showing the musical performance condition;

FIG. 7 is a longitudinal section view showing the musical performance condition of FIG. 6;

FIG. 8 is an enlarged sectional view showing portions of the driving means and the transmission means;

FIG. 9 is a sectional view thereof;

FIG. 10 is a plan view thereof, also;

FIG. 11 is a sectional view thereof; and

FIG. 12 is a plan view thereof.

DETAILED DESCRIPTION OF THE INVENTION

Figure 1:
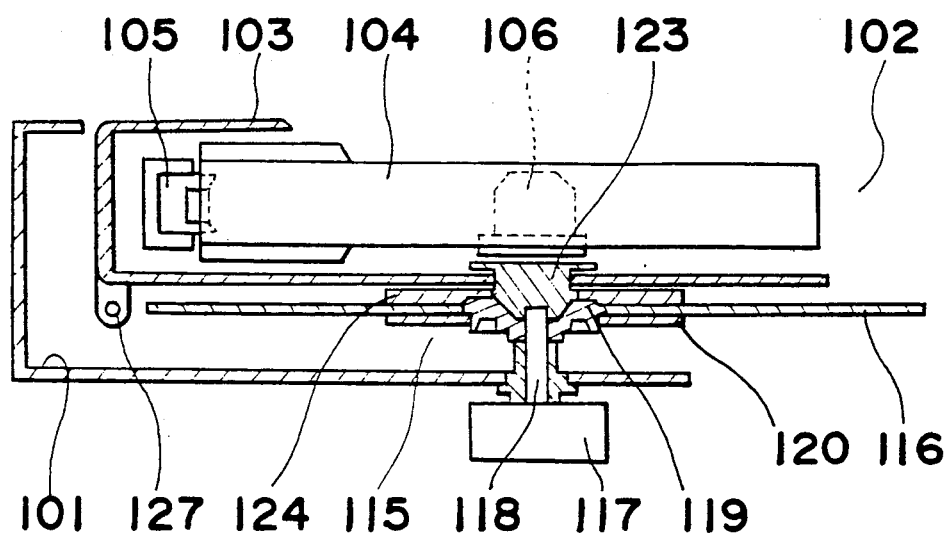
FIG. 1 through FIG. 4 relate to a tape recorder with a disc player attached to it in a first embodiment.
Figure 2:
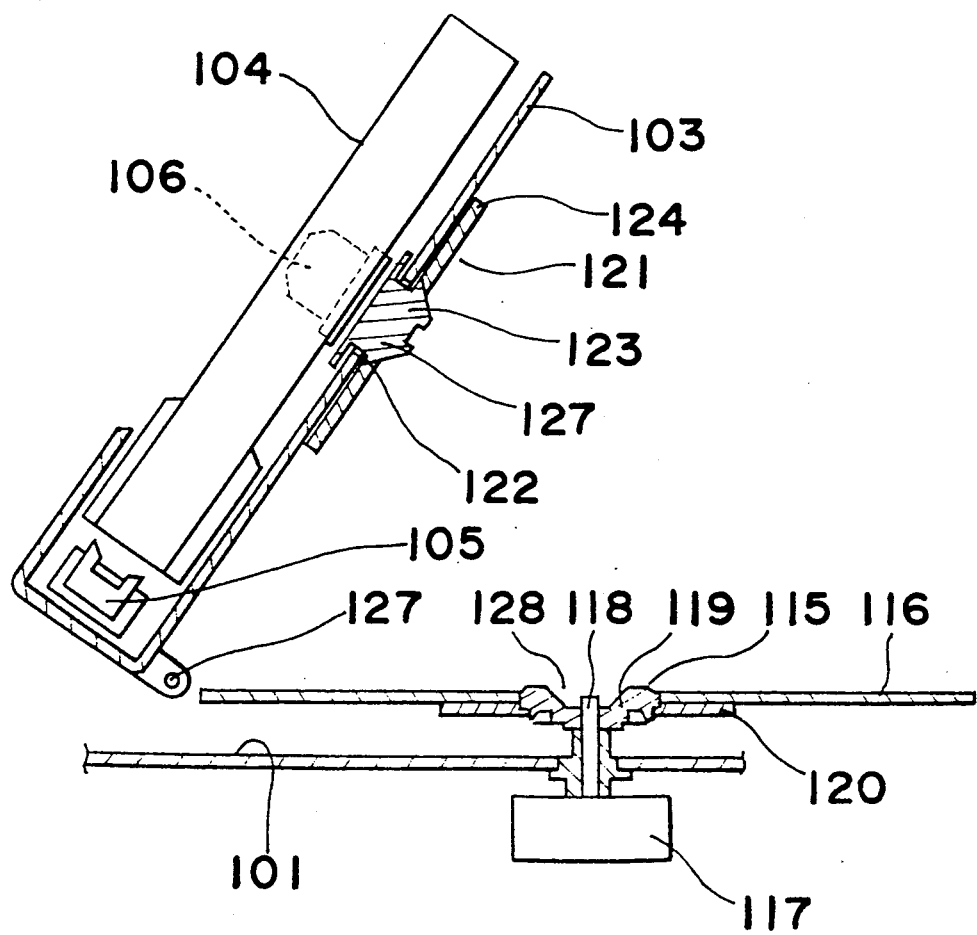
Figure 3:
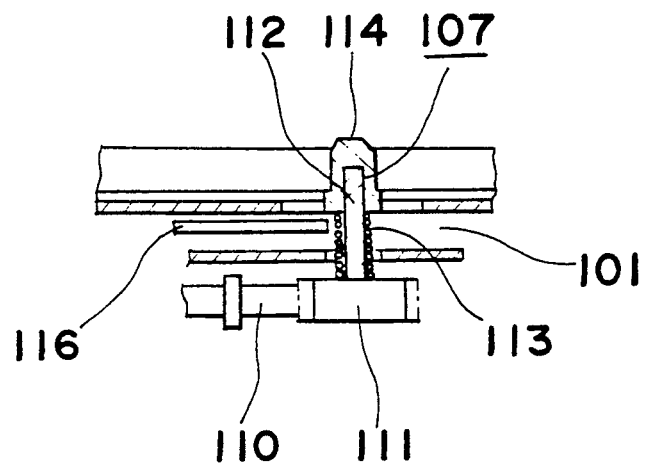
Figure 4:
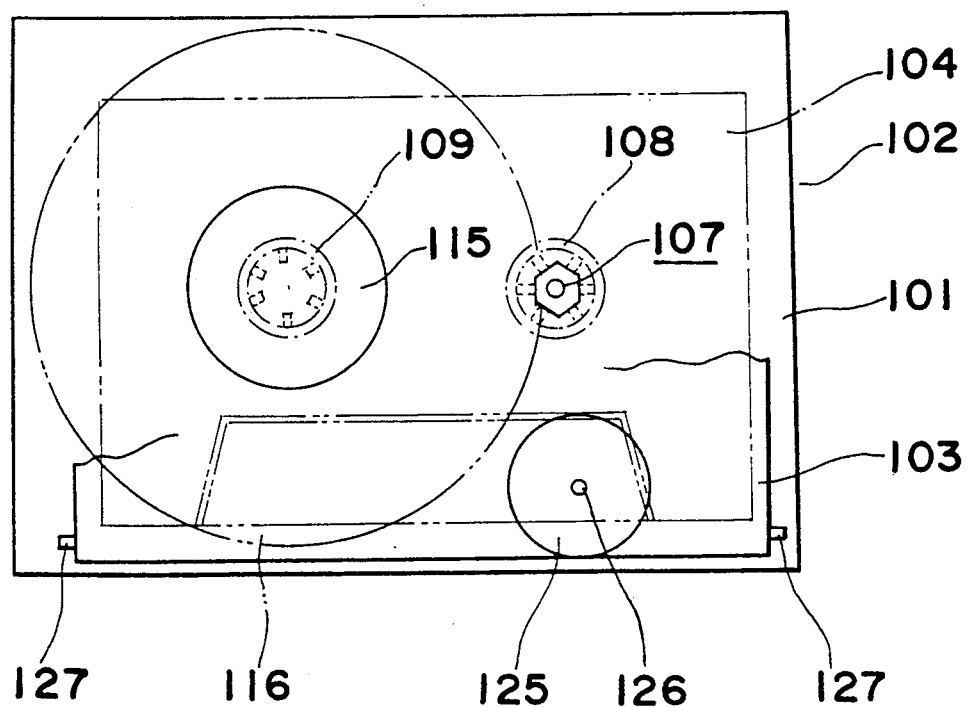

Referring now to the drawings, there are shown the embodiments of the present invention as a tape recorder with a disc player attached to it in accordance with the present invention.

Embodiment 1

Referring to FIG. 1 through FIG. 4, a tape cassette accommodating portion (101) is formed within the case (102) of the tape recorder. A tape cassette holder (103) is mounted in the tape cassette accommodating portion (101) to be pivoted between a tape taking-out position and a tape musical performance position. A magnetic head (105) to be slided in the direction of the tape cassette (104) engaged through the pivoting operation of the tape cassette holder (103) is provided, with a tape feed reel shaft (106) being rotatably provided. A tape winding reel shaft (107) is provided in a position opposite to the hub (108) on the winding side of the tape cassette (104) of the tape cassette accommodating portion (101), and has a gear (111) to be interlocked with a gear (110) to be rotated by the motor (not shown), and a reel cap (114) mounted through the spring (113) on the rotary shaft (112) to be rotated integrally with the gear (111). A turntable (115) for rotating the disc (116) is provided on the sam axis as the position where the hub (109) on the feed side of the tape cassette (104) of the tape cassette accommodating portion (101) is opposite, and slightly under the position where the cassette holder (103) is located. The turntable is composed of a rotary shaft (118) to be rotated by the motor (117), a centering member (119) to be rotated integrally with the rotary shaft (118), and a disc placement plate (120) mounted on the outer periphery of the centering member (119). A clamper (121) is provided on the under face of the tape cassette holder (103) opposite to the turntable (115). The clamper is composed of a rotary member (123) mounted rotatably in the hole (122) in the under face of the tape cassette holder (103), and a disc restraint plate (124) which is formed of a magnet and is rotated together with the rotary member (123). A capstan (126) which is a shaft of the flywheel (125) is provided to be located externally from the tap winding reel shaft (107) of the tape cassette accommodating portion (103).

The operation of the tape recorder with the disc player attached to it in accordance with the present invention will be described hereinafter.

For the musical performance by the disc (116), the tape cassette holder (103) is pivoted around the shaft (127). As the tape feed reel shaft (106) is provided within the tape cassette holder (103), but is not provided in the tape cassette accommodating portion (101), the turntable (115) is exposed to the surface. Accordingly, the disc (116) may be engaged manually on the turntable (115). When the disc (116) is of a 8 cm CD, the half diameter of the disc (116) is 40 mm. As the interval between the centers of the hubs (108) and (109) of the Phillips type of compact tape cassette (104) on the market at present is 42.5 mm, it is not brought into contact against the tape winding reel shaft (107). Also, as there is not a capstan (126) on the tape feed side, they are not interfered with in the engagement of the disc (116).

After the disc (116) has been placed on the turntable (115), the tape cassette holder (103) is pivoted in a direction opposite to the above direction so as to be pivoted into the tape musical performance position shown in FIG. 1. When the tape cassette holder (103) is provided in the musical performance position, the projection portion (127) of the rotary member (123) of the clamper (121) is engaged into the concave portion (128) of the centering member (119) of the disc (116), furthermore the disc restraint (124) magnetically adheres onto the disc placement plate (120) of the turntable (115) so as to clamp the disc (116) against the turntable (120). Accordingly, the disc (116) is rotated together with the turntable by the rotation of the motor (117) to effect the musical performance of the disc (116).

For the musical performance of the tape cassette (104), the tape cassette holder (103) is pivoted into the taking-out position as described hereinafter. As the magnetic head (105) is retreated in such a condition, and the opening face is floated, the tape cassette (104) is inserted into the cassette holder (103), with the one hub (109) being engaged with the tape feed reel shaft (106). Thereafter, the tape cassette holder (103) is pivoted in a direcvton opposite to the above description, the magnetic head (105) is advanced to come into contact against the tape, and also the hub (108) on the tape winding side is engaged with the tape winding reel shaft (107). Accordingly, when the regenerating button is operated, the motor (not shown) is rotated to rotate the flywheel (125). The capstan (126) inserted into the tape cassette (104) is also rotated to run the tape together with the pinch roller (not shown) at a constant speed. Also, as the rotating force of the motor is transmitted even into the gear (111) through the gear (110), the tape winding reel shaft (107) is rotated to rotate the hub (109) on the tape winding side so as to wind the tape run at the constant speed by the pinch roller and the capstan (126). Accordingly, the information recorded on the tape may be reproduced by the magnetic head (105).

The tape recorder is switched onto the recording condition by the operation of the record button during the musical performance by the disc (116), and the information reproduced by the disc (116) may be recorded on the tape.

In order to remove the tape cassette (104) after the completion of the tape regeneration or recording, the tape cassette holder (103) is pivoted into the tape cassette taking-out position to project the opening face externally of the tape cassette accommodating portion (103) as the ordinary tape recorder does. If only the tape cassette holder (103) is floated with the tape cassette (103) being engaged with the tape cassette holder (103) even when the disc (116) is exchanged, the turntable (115) is exposed as described hereinabove, so that the disc (116) may be manually removed. Or if the tape cassette holder (103) is pivoted into the tape engagement position after the different disc (116) has been engaged with the turntable (115), the tape cassette (104) is set into the operating condition as described hereinabove, so that the disc (116) may be exchanged without the removing of the tape cassette (104) even if the tape cassette (104) and the disc (116) are piled or stacked together.

In the above description, the tape feed reel shaft (106) provided within the tape cassette holder (103) is simply provided only for its free operation. But the tape feed reel shaft (106) and the rotary member (123) of the clamper (121) are provided disengageably coupled to each other and the tape feed reel shaft (106) is spliced with the rotary memory (123) at the tape rewinding operation, so that the rotation force from the motor (117) is transmitted into the tape feed reel shaft (107) through the clamper (121) to rotate the tape feed reel shaft (107) at a high speed in a direction opposite to that in the tape feed operation so as to rotate the hub (108) reversely at a high speed to rewind the tape.

When the tape rewinding function is not required especially, the tape feed reel shaft (106) is not always required to be provided on the tape cassette holder (103). In such a mechanism, as there are no obstacles in the insertion of the tape cassette (104) into the tape cassette holder (103), the magnetic head (105) is not required to be slided. As the tape cassette holder (104) may be also blockaded except for the front face opening, the tape cassette holder (103) may serve as a cover member.

As is clear from the foregoing description, according to the tape recorder with the disc player to it in the first embodiment of the present invention, the tape winding reel shaft is provided in one of the right and the left of the tape cassette accommodating portion, and the turntable for the disc driving use is provided in the other thereof for the tape feed reel shaft, so that a turntable for the 8 cm CD disc driving use is to be positioned in opposition to the hub on the tape feed side of the compact tape cassette to be accommodated into the tape cassette accommodating portion so as to minimize the size of the case in the right and left direction.

Also, the tape cassette holder is provided to simplify the replacement of the disc, because the displacement of the disc on the lower side of the tape cassette may be effected without the detachment of the tape cassette.

Furthermore, the clamper may be mounted in a position facing the turntable of the tape cassette holder so as to remove the other member especially for mounting the clamper.

When necessary, provide the tape feed reel shaft in the tape cassette holder so as to rotate the tape feed reel shaft, in a direction opposite to that in the tape feed operation, by the rotation force and so on of the turntable, and the tape may be rewound.

Embodiment 2

Figure 8:
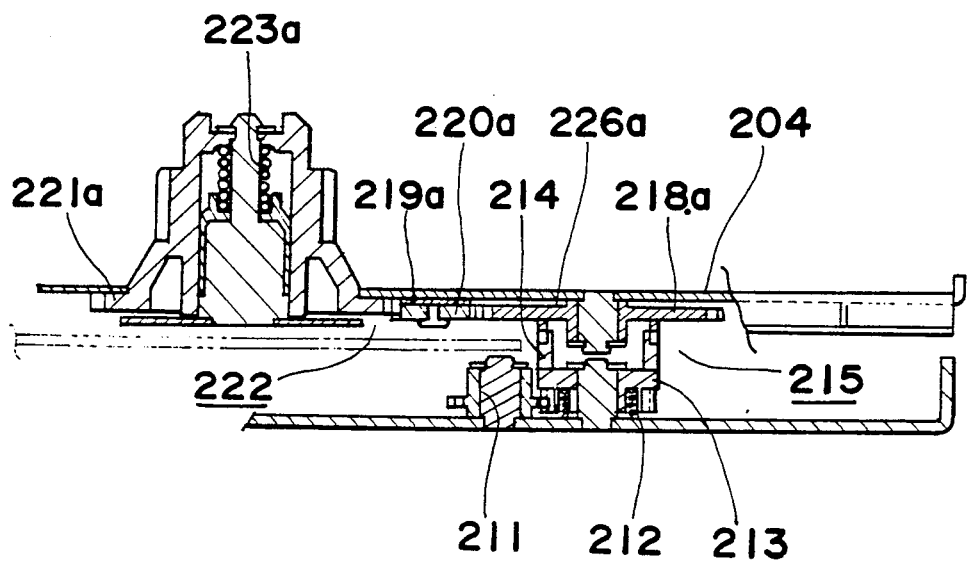

Referring to FIG. 5 through FIG. 8, the tape recorder main body (201) is composed of a case main body (202) and a tape cassette holder (203) pivotally mounted on the case main body (202), with an auxiliary chassis (204) being provided pivotally on the tape cassette holder (203). The case main body (202) is provided at its approximate center with a motor for disc use (205), a centering member (207) mounted on the rotary shaft (206) of the motor for disc use (205), and a turntable (208). Also, a reel shaft driving means (215) is provided sideways of the case main body (202), composed of flywheels (210a), (210b) which are operatively cooperated with the tape motor (not shown) through the belt, with the capstans (209a), (209b) being upwardly projected, a driving gear (211) to be driven by the reel motor as shown in FIG. 8, and a transmission gear (213) to be mounted rotatably so as to be vertically moved somewhat by the spring (212) and to be interlocked with the driving gear (211). Also, an accommodating portion (217) for accommodating the tape cassette (216) is formed on the tape cassette holder (208), and also, the auxiliary chassis (204) is pivotally mounted on the lower face thereof, with the magnet clamper (209) is mounted above and below for its free rotation on the auxiliary chassis (204) in opposition to the turntable (208). Also, a transmission means (222) is provided which is composed of transmission gears (218a), (218b) opposite to the transmission gear (213), the intermediate gears (220a), (220b) to be mounted on the levers (219a), (219b) and to be interlocked with the transmission gears (218a), (218b), and the reel gears (221a), (221b) to be interlocked with the intermediate gears (220a), (220b), with the reels shafts (223a), (223b) being formed integrally on the reel gears (221a), (221b).

The operation of the tape recorder with the disc player attached to it in accodance with the present invention will be described hereinafter.

Figure 5:
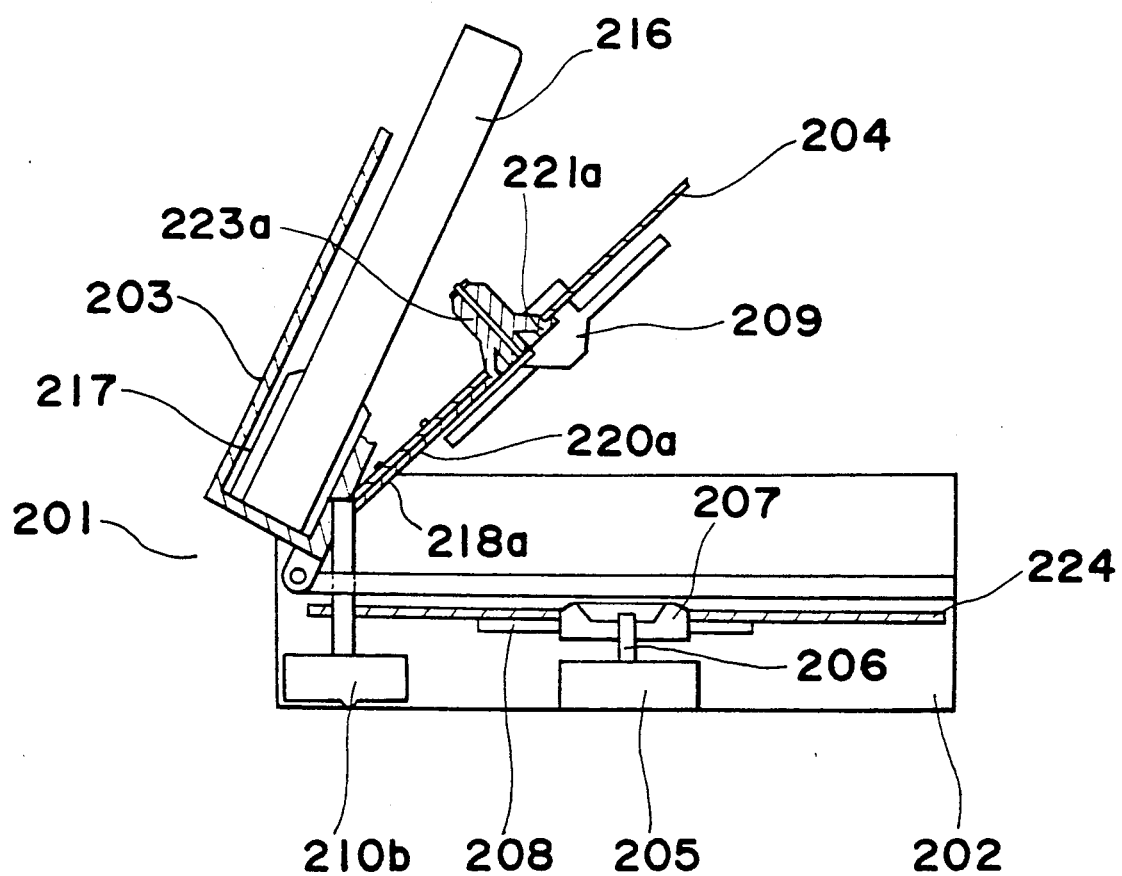
FIG. 5 through FIG. 8 relate to a tape recorder with a disc player attached to it in a second emodiment.
Figure 6:
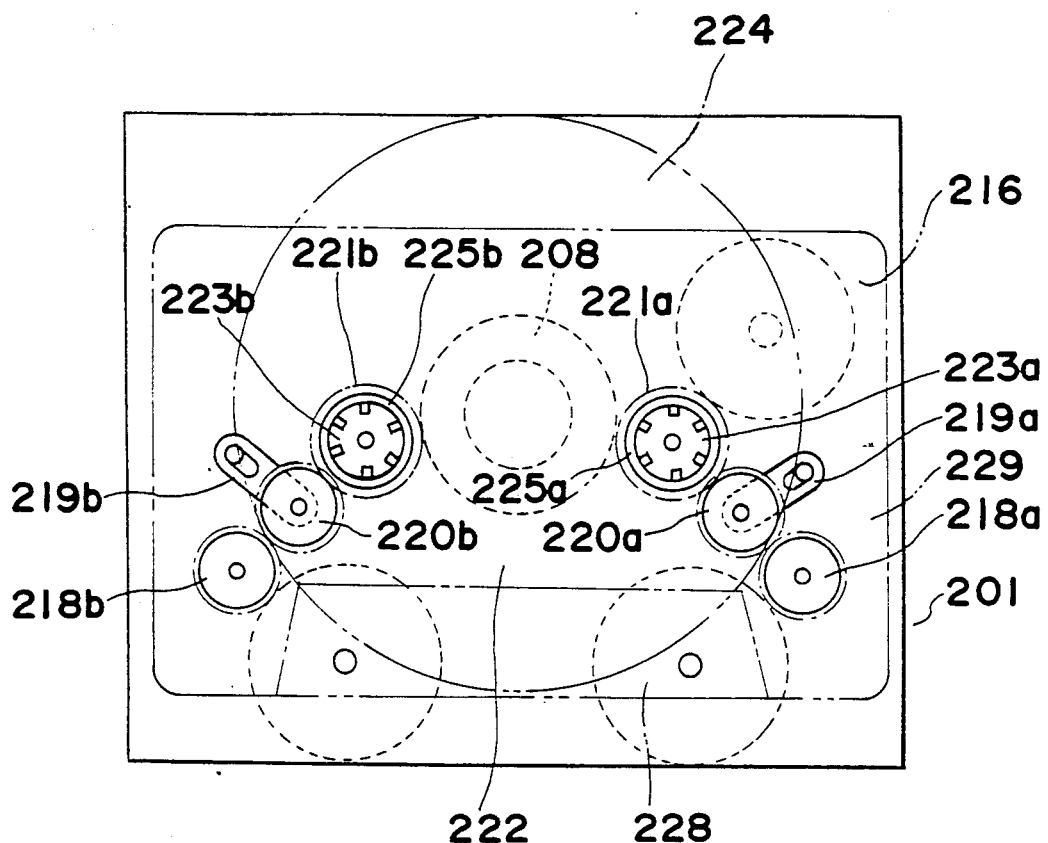
Figure 7:
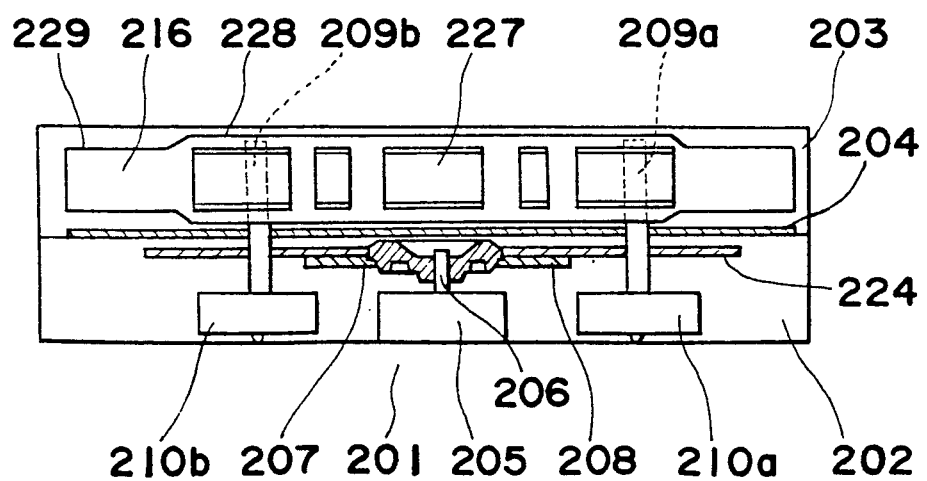

In order to engage the disc (224) and the tape cassette (216), the tape cassette holder (203) is pivoted in an upper direction as shown in FIG. 5. As the turntable (208) is exposed in such a condition, the disc (224) is placed manually on the turntable (208). At this time, the auxiliary chassis (204) is pivoted somewhat downwardly from the tape cassette holder (203), and the reel shafts (221a), (221b) are withdrawn from the tape admission passage of the tape cassette holder (203), so that the tape cassette (216) may be inserted and accommodated without interference into the tape cassette holder (203).

When the disc (224) is placed on the turntable (208) and the tape cassette holder (203) is pivoted in a direction of the case main body (202) with the tape cassette (216) being accommodated into the tape cassette holder (203), the auxiliary chassis (204) is accommodated into the tape cassette holder (208), and the tape hubs (225a), (225b) are engaged into the reel shafts (221a), (221b). As the tape cassette holder (208) is pivoted into the case main body (202), the capstans (209a), (209b) pass through the holes to insert into the tape cassette (216). The projections (226a), (226b) of the transmission gears (218a), (218b) and the projection (214) of the transmission gear (213) are engaged, and also, the magnet clamper (209) of the auxiliary chassis (204) adheres onto the turntable (208) so as to secure the disc (224) onto the turntable (208) to provide the condition for the musical performance.

Depress the disc regenerating button in this condition, and the disc motor (205) is rotated to rotate the disc (224) together with the turntable (208) so as to start the musical performance of the disc (224).

When the forward direction tape regenerating button is operated, the flywheels (210a), (210b) are rotated by the tape motor. But only the pinch roller (not shown) located on the right side adheres under pressure against the capstan (209a) through the tape (227) to run the tape (227) at the constant speed in the forward direction, so that the signal to be recorded on the tape (227) is reproduced by the magnetic head (not shown). At this time, the rotation force of the tape motor is transmitted through the driving gear (211), the transmission gear (213), the transmission gear (218a) and the intermediate gear (220a) to rotate the reel gear (221a), so that the hub is also rotated so as to wind the tape (227) at the constant speed by the capstan (209a) and the pinch roller.

At this time, as the lever (219b) is slided and the intermediate gear (220b) is separated from the reel gear (221b), the reel shaft (223b) on the left side is not rotated.

When the reverse direction regenerating button is operated, the pinch roller which has adhered under pressure against the capstan (209a) on the left side is separated to cause the pinch roller to adhere against the capstan (209b) on the right side through the tape (227), and also, the tape motor is rotated in a direction opposite to that provided so far, so that the tape (227) runs at the constant speed in a direction opposite to the previous direction to effect the regenerating operation in the reverse direction. Also, the intermediate gear (220a) is separated from the reel gear (221a), the intermediate gear (220b) on the left side is interlocked with the reel gear (221b) so as to transmit the rotation force of the tape motor into the reel gear (221b) in the same way as described hereinabove to rotate the reel shaft (223) for winding the tape (227).

In the above description, the transmission means (222) is adapted to drive the right and left reel shafts (223a), (223b) by the intermediate gears (220a), (220b) and the transmission gears (218a), (218b) separately provided, but the rotation forces may be transmitted into the right, left reel shafts (223a), (223b) respectively through a plurality of intermediate gears in the transmission gears, with the transmission gears serving as right, left reel shafts (223a), (223b).

Also, although the disc motor and the tape motor are separately provided, the disc motor and the tape motor may be provided in one when the disc and the tape are not required to be played simultaneously like a regenerating exclusive machine.

If the turntable (208) is positioned in the center approximately between the reel shafts (223a) and (223b) in the regenerating machine for the 8 cm CD disc exclusive use, the 8 cm CD disc may be placed on the turntable (224) without being interfered with by the capstans (209a), (209b), thus resulting in approximately the same size as that of the conventional head horn stereo tape recorder.

As the Philips type of compact tape cassette (216) is made thicker in the head inserting portion (228) and thinner in the hub accommodating portion (229), the thickness of the tape cassette holder (203) is hardly increased when the transmission means (222) is provided in a position facing the hub accommodating portion (229) of the compact tape cassette (216).

As is clear from the foregoing description, according to the tape recorder with the disc player attached to it in the second embodiment of the present invention, the turntable for the disc musical performance use, the capstan and the reel shaft driving means are provided on the case main body, the reel shaft, and the transmission means for giving the rotating force into the reel shaft are provided on the auxiliary chassis pivotally provided on the tape cassette holder. Therefore when the tape cassette is engaged with the tape cassette holder, the reel shaft and so on are withdrawn from the admission passage not to interfere with the engagement of the tape cassette or the turntable which is also exposed, so that the disc may be engaged with the turntable or may be disengaged from it.

Furthermore, when the tape cassette holder has been placed in the musical performance position, the reel shaft driving means and the transmission means are engaged with each other to rotate the reel shaft for winding the tape. The disc player may be built-in within the head horn type of tape recorder without increasing the size and thickness of the main body.

Embodiment 3

Figure 9:
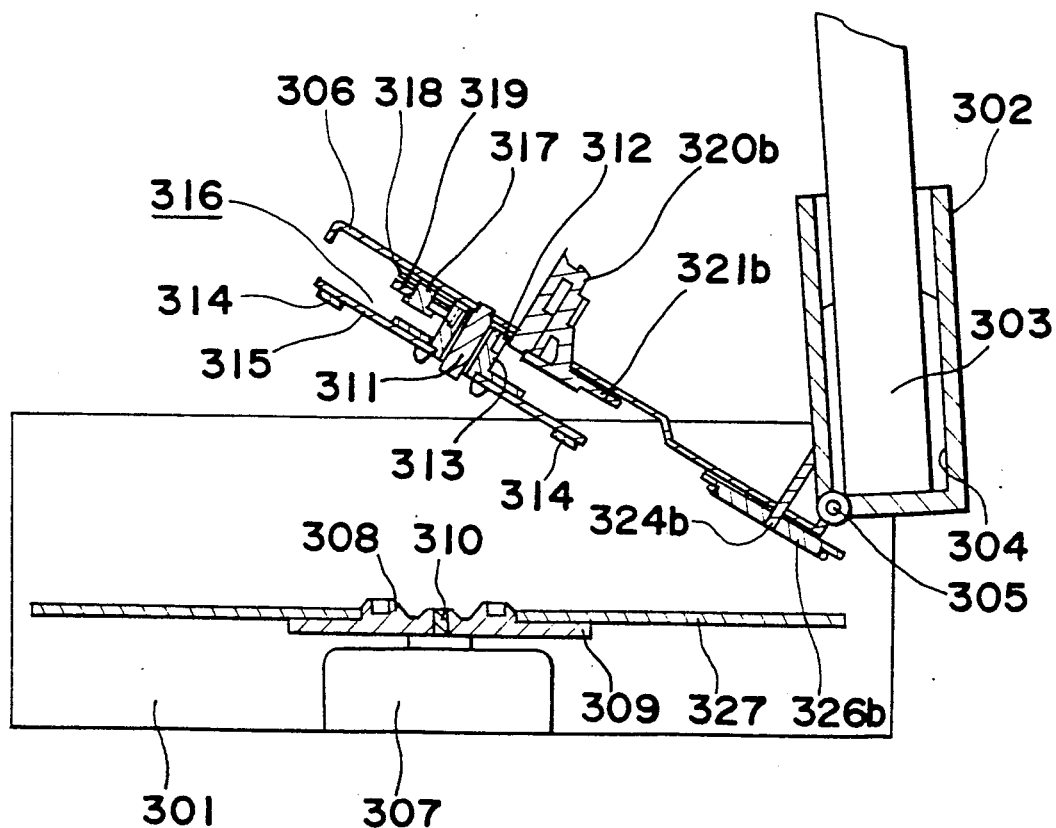
FIG. 9 and FIG. 10 relate to a tape recorder with a disc player attached, to it in a third embodiment of the present invention.
Figure 10:
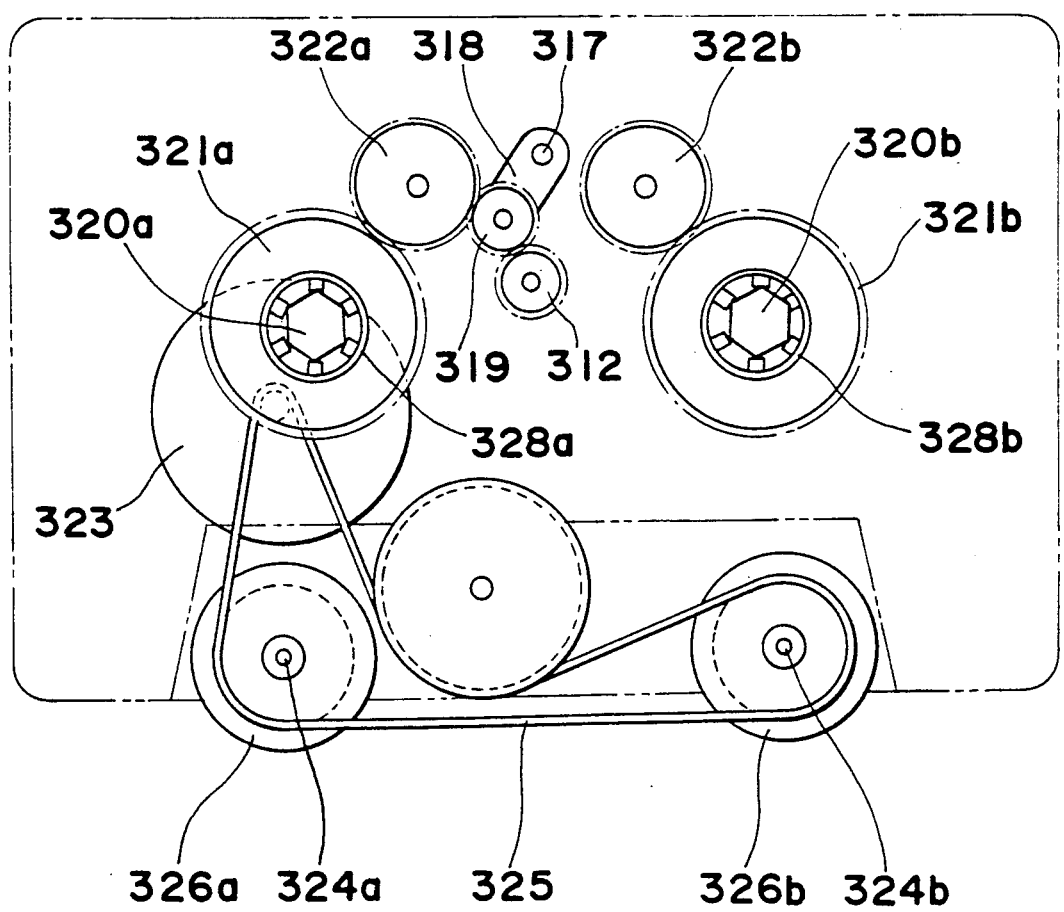

Referring to FIG. 9 and FIG. 10, a cassette holder (302) has the accommodating portion (304) of the tape cassette (303), and is supported through the shaft (305) on the case main body (301). The auxiliary chassis (306) is further mounted pivotally on the cassette holder (302). The case main body (301) is provided with a spindle motor (307), a centering portion (308) made of a magnetic material, and also, with a turntable (309) mounted on the rotary shaft (310) of the spindle motor (307). Also, a clamper (331) which has a calked shaft (311), a chucking member (313) mounted rotatably on the shaft (311) with a driving gear (312) being formed, a disc restraint plate (315) which is integrally rotated with the chucking member (313), with the magnets (314), (314) being mounted in opposition to the turntable (309), a transmission gear (319) to be mounted on the mounting metal fixture (318) supported on the shaft (317) to interlock with the driving gear (312), and right, left reel shafts (320a), (320b) having reel gears (321a), (321b) to be interlocked with the transmission gear (319) through the transmission gears (322a), (322b) are provided on the auxiliary chassis (306).

Furthermore, a capstan motor (323), capstans (324a), (324b) are provided on the auxiliary chassis (306), with the flywheels (326a), (326b) to be operatively cooperated and rotated with the belt (325) being mounted on the capstan motor (323).

The operation of the tape recorder with the disc player attached to it in accordnce with the present invention will be described hereinafter.

In order to engage the CD disc (327) to be played and the tape cassette (303), the cassette holder (302) is pivoted in an opening direction as shown in FIG. 9. In this condition, the turntable (309) is externally exposed, the opening portion of the cassette holder (302) is upwardly opened, and the auxiliary chassis (306) is downwardly positioned away from the cassette holder (302), so that the reel shafts (320a), (320b), the projecting portions of the capstans (324a), (324b) and so on are not positioned within the cassette holder (302). Accordigly, the tape cassette is engaged into the cassette holder (302) by the insertion of the tape cassette (303) from the opening of the cassette holder (302). Also, take the CD disc (327) manually above the turntable (309) to engage the centering portion (308) into the central hole of the CD disc (327), so that the CD disc (327) may be engaged onto the turntable (309).

Thereafter, pivot the cassette holder (302) in the direction of the musical performance position, and the auxiliary chassis (306) is accommodated into the cassette hodler (302). The reel hubs (328a), (328b) of the tape cassette (303) are engaged with the reel shaft (320a), (320b), the capstans (324a), (324b) are inserted from the holes (not shown) and are positioned within the cassette holder (303). Upon further pivoting operation of the cassette holder (303) into the musical performance position, the magnets (314), (314) of the disc restraint plate (315) magnetically adhere on the turntable (309) through the CD disc (327) so as to secure the CD disc (327) against the turntable (309).

When the CD disc (327) is going to effect the musical performance in such a condition, the spindle motor (307) is rotated and the turntable (309) is also rotated if the CD regenerating button is operated. Thus, the CD disc (327) is also rotated together with the turntable (309). Accordingly, the light beams illuminated from the light pick up (not shown) are reflected in accordance with the pit and lands recorded on the surfaces of the CD disc (327). The reflected light beams are detected by the photo cells within the light pick up and are added into the signal processing circuit, so that the recorded voice signals are drawn out to effect the performance of the music and so on. At this time, the driving gear (312) of the clamper (316) is rotated together with the turntable (309) and the transmission gear (319) to be interlocked with the driving gear (312) is also rotated. At this time, the transmission gear (319) remains neutral without the interlocking of either of the transmission gears (322a), (322b). As the reel shafts (320a), (320b) are not rotated or the capstan motor (323) is not rotated, either, so that the tape cassette (303) is not influenced at all.

A case where the tape cassette (303) is played will be described hereinafter.

In order to reproduce the tape in the forward direction, operate the forward direction regenerating button, and the capstan motor (323) is rotated in the given direction, and also, the head base (not shown) is slided in the musical performance direction to depress the tape against the head and to depress the pinch roller (not shown) through the tape against the capstan (324a) on the left side. The tape is run at the constant speed by the capstan (324a) and the pinch roller so as to reproduce the siganls recorded by the head.

At this time, as the spindle motor (307) is also rotated, the driving gear (312) of the clamper (316) is also rotated together with the turntable (309), and the reel gear (312a) is rotated through the transmission gear (319) to be interlocked with the driving gear (312), and the transmission gear (322a) so as to rotate the reel shaft (320a). Accordingly, the reel hub (328a) to be engaged with the reel shaft (320a) is also rotated to wind the tape at a constant speed by the capstan (324a) and the pinch roller.

As the winding diameter becomes larger as the tape is wound around the reel hub (328a), the speed of the tape to be wound becomes faster to pull the tape. But in the present invention, as the turntable (309) and the clamper (316) are magnetically combined with each other, the slip is caused not to apply the tension upon the tape more than necessary.

Although the CD discs (327) is rotated at this time, the voltage is not applied upon the regenerating circuit of the light pick up or the like, and the signals are not reproduced, thus causing no influences.

When the regeneration in the forward direction is completed, the capstan motor (323) or the like is automatically rotated oppositely to the rotation given so far and is rotated in the opposite direction. The pinch roller which has adhered under pressure against the capstan (324a) is separated and the other pinch roller is instead depressed against the capstan (324). Also, the transmission gear (319) is interlocked with the reel gear (321b) through the transmission gear (322b).

Therefore, the tape is run at the constant speed by the capstan (324b) and the pinch roller in a direction opposite to that provided so far so as to effect the regeneration in the opposite direction. At this time, the transmission gear (319) is interlocked with the reel gear (321b) through the transmission gear (322b) and the spindle motor (323) is also rotated in the opposite direction, so that the reel shaft (320b) is also rotated reversely to wind the tape at the constant speed, by the reel hub (328b).

In the above-described embodiment, although the capstan motor (323), and the flywheels (326a), (326b) and so on to be driven by the capstan motor (323) were provided on the auxiliary chassis (306), they may be provided within the case main body (301).

As is clear from the foregoing description, according to the tape recorder with the disc player attached to it in the third embodiment of the present invention, the auxiliary chassis is further pivotally mounted on the cassette holder pivotally provided on the case main body, the clamper having the driving gear, the transmission gear to be interlocked with the driving gear, the reel shaft and so on are provided on the auxiliary chassis. The clamper and the turntable for the disc musical performance use provided on the case main body are magnetically combined, when the cassette holder is positioned in the operating condition, to transmit the rotation force of the spindle motor into the reel shaft so that the reel shaft may be rotated by the spindle motor, thus requiring no motor for driving the reel shaft so as to provide a smaller size.

Also, as the clamper is magnetically combined with the turntable, the amount of the tape to be wound by the reel hub increases and the tension for winding the tape run at the constant speed by the capstan and the pinch roller becomes larger, so that the clamper and the turntable are slipped to prevent the tension more than necessary from being applied on the tape to be wound.

Embodiment 4

Figure 11:
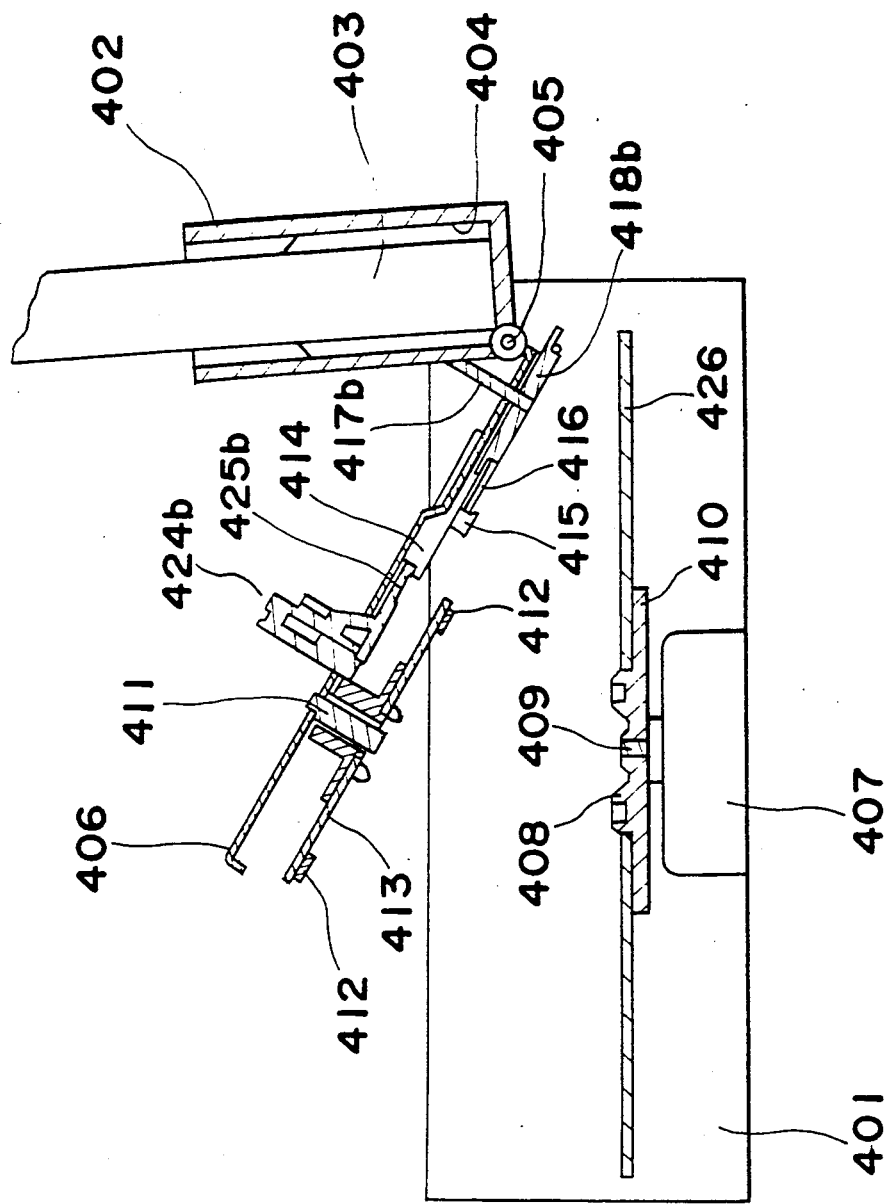
FIG. 11 and FIG. 12 relate a tape recorder with a disc player attached to it in a fourth embodiment of the present invention.
Figure 12:
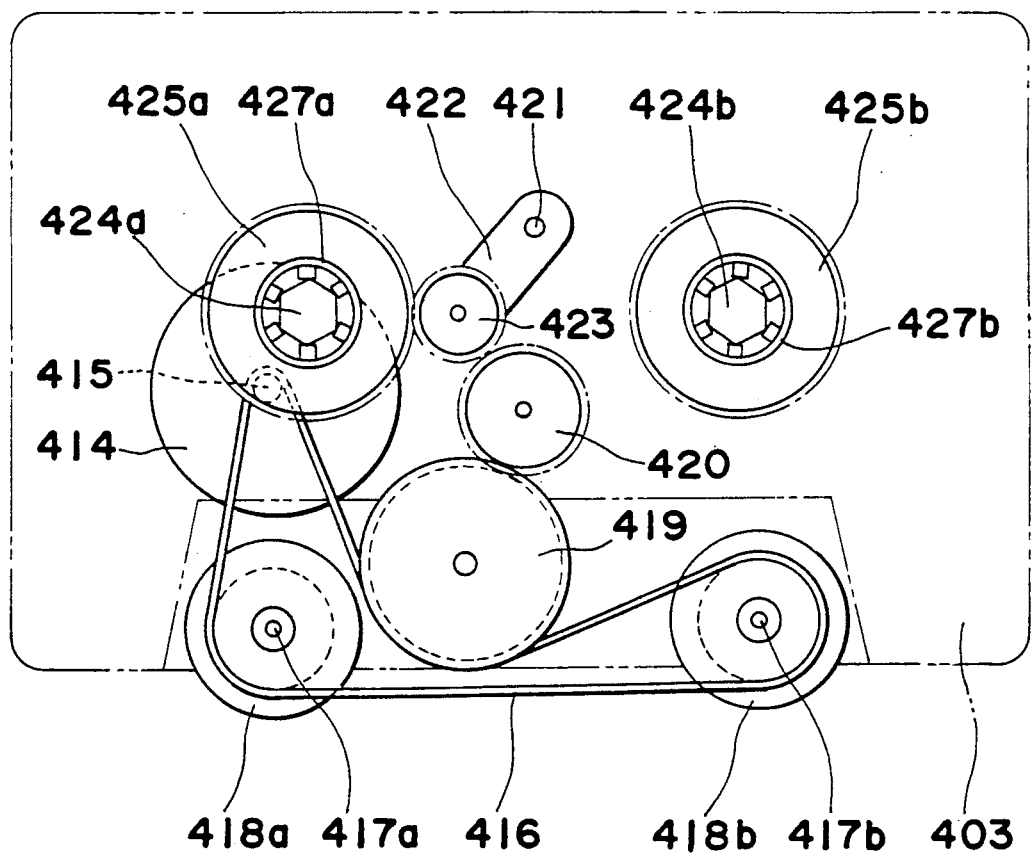

Referring to FIG. 11 and FIG. 12, a cassette holder (402) has an accommodating portion (404) of the tape cassette (403). It is supported by a shaft (405) on the case main body (401). Furthermore, an auxiliary chassis (406) is pivotally mounted on the cassette holder (402). The case main body (401) is provided with a spindle motor (407), a centering portion (408) made of a magnetic material and also, a turntable (410) mounted on the rotary shaft (409) of the spindle motor (407). Also, a clamper (413) mounted rotatably on the calked shaft (411), with magnets (412), (412) being provided with respect to the turntable (410), a capstan motor (414), flywheels (418a), (418b) interlocked with the rotary shaft (415) of the capstan motor (414) by the belt (416) and having the capstan (417a), (417b), an idler gear (419) to be rotated by the belt (416), a driving gear (420) to be interlocked with the idler gear (419), and a transmission gear (423) mounted on the mountng metal fixture (422) supported by the shaft (421) and to be selectively interlocked with the reel gears (425a), (425b) having the reel shafts (424a), (424b) are provided on the auxiliary chassis (406).

The operation of the tape recorder with the disc player attached to it in accordance with the present invention will be described hereinafter.

In order to engage the CD disc (426) and the cassette tape (403) for the regenerating operation, the opening of the cassette holder (402) is directed at the top face, and also, the turntable (410) is externally exposed when the cassette holder (402) is rotated. Accordingly, the hole of the 8 cm CD disc (426) is engaged into the centering portion (408) to engage the CD disc (426) with the turntable (410). Also, at this time, the auxiliary chassis (406) is away from the cassette holder (402) and the reel shafts (424a), (424b) and the capstans (417a), (417b) are withdrawn from the admission package, so that the cassette tape (403) may be engaged with the accommodating portion (404) of the cassette holder (402). When the cassette holder (402) is pivoted for the blockading operation in a direction opposite to the above description in such a condition, the auxiliary chassis (406) is accommodated within the cassette holder (402), the reel shafts (424a), (424b) are engaged with the reel hubs (427a), (427b), and also, the capstans (417a), (417b) are inserted into the holes of the cassette tape (403). The magnets (412), (412) of the clamper (413) adhere on the turntable (410) to clamp the CD disc (426) into a standby condition.

When the regenerating button is operated to effect the musical performance of the CD disc (426), the spindle motor (407) is rotated, and the CD disc (426) is rotated together with the turntable (410), so that the signals recorded on the CD disc (426) are taken out by the light pick up (not shown) to reproduce the music and so on.

When, for example, the forward direction regenerating button (not shown) is operated to reproduce the cassette tape (403), the capstan motor (414) is rotated to rotate the flywheels (418a), (418b) through the belt (416) by the rotating force of the capstan motor (414). When the flywheels (418a), (418b) are rotated, the capstans (417a), (417b) are also rotated. As the pinch roller (not shown) adheres under pressure through the tape against the capstan (417a) on the left side, the tape is run at the constant speed from the right to the left to reproduce by the magnetic head (not shown) the signals recorded on the tape. At this time, the idler gear (419) is also rotated by the rotating force of the capstan motor (415) to be transmitted through the belt (416), the rotating force of the idler gear (419) rotates the driving gear (420), the reel gear (425a) through the transmission gear (423) to be interlocked with the reel gear (425a) at this time. Accordingly, the reel hub (427a) to be engaged with the reel shaft (424a) of the reel gear (425a) is rotated to wind the tape ran at the constant speed by the capstan (417a) and the pinch roller.

When the tape has been wound to the trailing end and the forward direction regeneration has been completed, the winding operation of the tape down to the trailing end threof is detected. Or by the operation of the reverse direction regenerating button, the rotating direction of the capstan motor (414) is reversed, and also, the pinch roller which has adhered under pressure against the capstan (417a) through the tape is separated. Instead, the different pinch roller (not shown) adheres under pressure against the capstan (417b) through the tape, and the mounting metal fitxture (422) is pivoted counterclockwise to interlock the transmission gear (423) with the driving gear (420) and the reel gear (425b). This time the tape is run at the constant speed in a direction from the left to the right by the capstan (417b) and the pinch roller to wind the tape run at the constant speed by reel hub (427b) to be rotated at this time so as to effect the regenerating operation of the opposite direction.

In the above description, a case where the cassette tape (403) and the CD disc (426) are separately reproduced is described, and the signals reproduced by the CD disc (426) may be recorded on the cassette tape. Namely, as described hereinabove, the regenerating button of the CD player is operated to renegerate the signal recorded on the CD disc (426). When the recording button of the tape is operated, the tape is run at the constant speed in the right direction by the capstan (417b) and the pinch roller as described hereinabove, and the tape run at the constant speed is wound by the reel hub (427b), and also, the electric circuit is watched into the recording condition. Accordingly, the signals generated by the CD disc (426) are fed onto the magnetic head and are recorded on the tape.

In the above description, in order to record the signals reproduced by the CD disc (426) on the tape, the rotation force of the reel gears (425a), (425b) are obtained from the capstan motor (414). But when the tape is not required to be recorded, the rotation force of the reel gears (425a), (425b) may be obtained by the spindle motor (419).

As is clear from the foregoing description, according to the tape recorder with the disc player attached to it in the fourth embodiment of the present invention, the turntable for the disc musical performance use is provided at the center of the case main body, the driving portion necessary for driving the tape for the reel shaft, the capstan and so on is mounted on the auxiliary chassis pivotally mounted on the cassette holder to enable the 8 cm CD disc to be reproduced with a size which is approximately the same as the conventional head horn type of tape recorder. The disc may be replaced with the cassette tape being engaged into the cassette holder by the pivoting of the cassette holder into the cassette taking-out position as the turntable is externally exposed. Furthermore, as the tape driving mechanism of the capstan or the reel shaft and so on is provided on the auxiliary chassis to be pivoted together with the cassette holder, the disc may be easily replaced, because the turntable is not interfered with by the tape driving mechanism. As the auxiliary chassis is separated from the cassette holder when it has been pivoted into the taking-out position of the cassette tape, the tape driving mechanism such as the reel shaft, the capstan or the like is retreated from within the cassette holder, so that the cassette tape may be engaged into the cassette holder.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A tape recorder provided with a disc player, comprising:
    a case body;
    a disc accommodating portion formed within the case body;
    a tape transporting body having at least one tape reel shaft mounted thereon, said tape transporting body being pivotally mounted on the case body so as to cover the disc accommodating portion;
    a turn table arranged within the disc accommodating portion; and
    a clamper disposed at the bottom surface of the tape transporting body at a position opposite to the turn table when said tape transporting body covers said disk accommodating portion.

2. The tape recorder as defined in claim 1, wherein said at least one tape reel shaft is positioned for engagement with a hub provided in a tape cassette and said tape transporting body further includes a transmission mechanism for selectively transmitting a driving force to the tape reel shaft in the tape transporting body, and a reel shaft driving means provided at one side of the case body to connect the transmission mechanism with the reel shaft driving means when the tape transporting body is located at a tape reproducing position close to the disc accommodating portion.

3. The tape recorder as defined in claim 1, wherein said tape transporting body further includes means for driving a cassette tape in the tape transporting body.

4. The tape recorder as defined in claim 1, further including means for connecting the clamper with the tape reel shaft.

5. The tape recorder as defined in claim 1, wherein the tape transporting body includes a tape cassette holder and an auxiliary chassis, said tape cassette holder and auxiliary chassis are separate and movable relative to each other to provide access to the disc accommodating portion when said tape cassette holder is moved to a position for removing a tape cassette, and the clamper is located at the bottom of the auxiliary chassis.

6. The tape recorder as defined in claim 1, wherein said tape transporting body includes a tape cassette holder, an auxiliary chassis and a transmission mechanism for selectively transmitting a driving force to each of two tape reel shafts on the auxiliary chassis, a tape reel shaft drive means at one side of the case body, and, when the tape cassette holder is disposed to cover the disk accommodating portion at a position for reproducing a tape, the tape reel shafts of the auxiliary chassis are engaged with hubs of a tape cassette being supported by the tape cassette holder, and the transmission mechanism is connected with the tape reel shaft drive means.

7. The tape recorder as defined in claim 5, wherein a tape reel shaft for engaging with a hub of a cassette tape and means for driving the tape reel shaft are provided on the auxiliary chassis, and the tape reel shaft of the auxiliary chassis is engaged with the hub of a tape cassette being supported by the tape cassette holder when the tape cassette holder is at a tape reproducing position close to the disc accommodating portion.

8. The tape recorder as defined in claim 7, wherein a fly wheel and a means for driving the fly wheel are also provided in the auxiliary chassis.

9. The tape recorder as defined in claim 5, wherein a tape reel shaft for engaging with a hub of a cassette tape is provided in the auxiliary chassis and further including means for connecting the clamper with the tape reel shaft.

* * * * *